Dec. 24, 1940.  A. A. EWALD  2,225,690
CHARGING APPARATUS FOR ELASTIC FLUIDS
Filed April 26, 1937  2 Sheets-Sheet 1
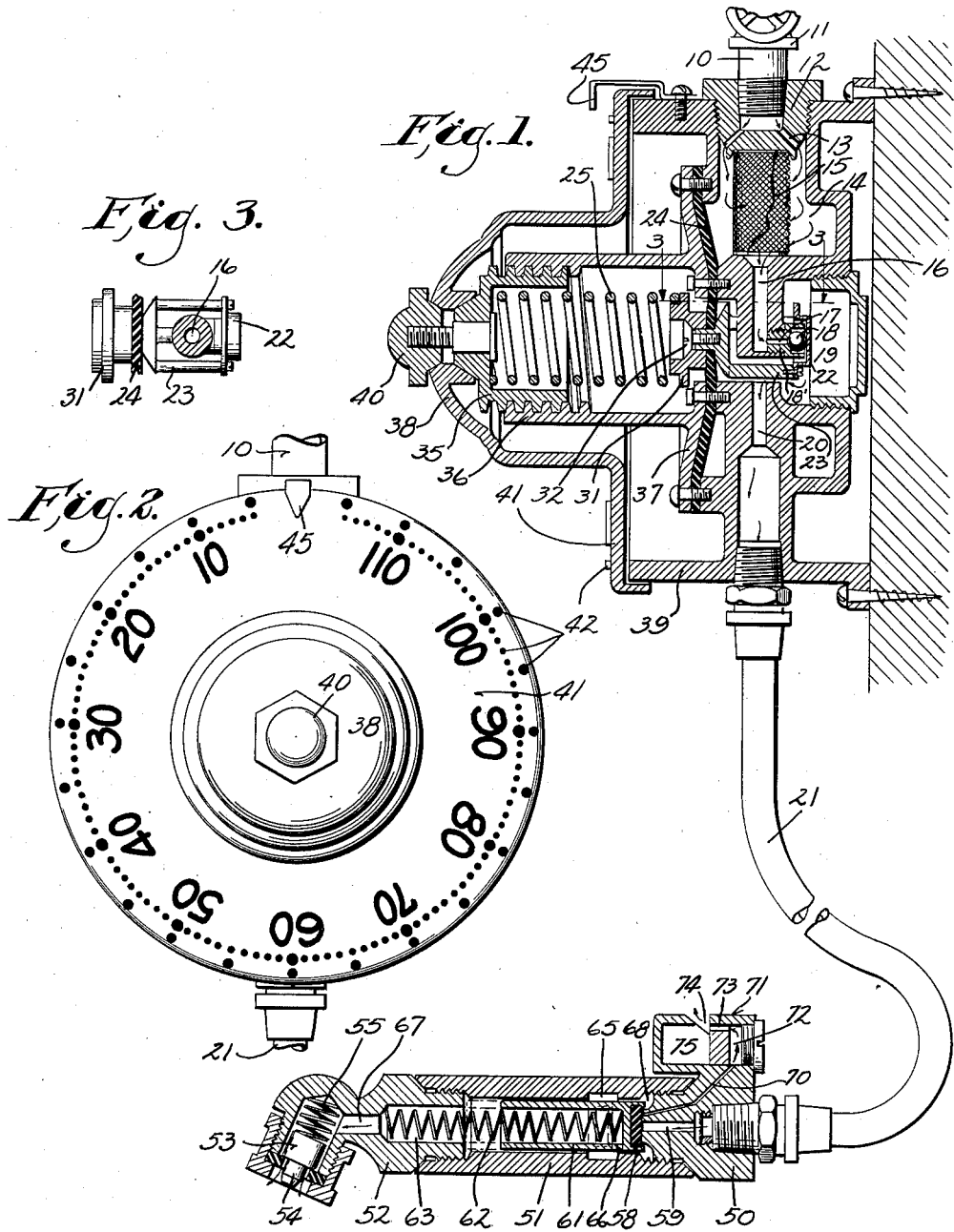
INVENTOR
Arno A. Ewald
BY Wheeler, Wheeler & Wheeler.
ATTORNEYS

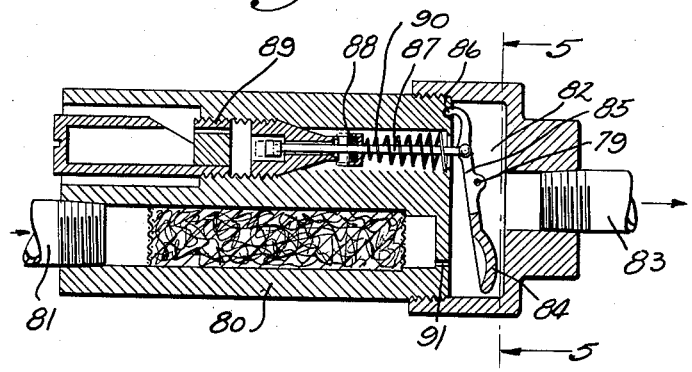
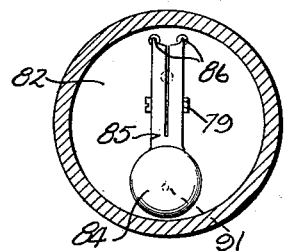
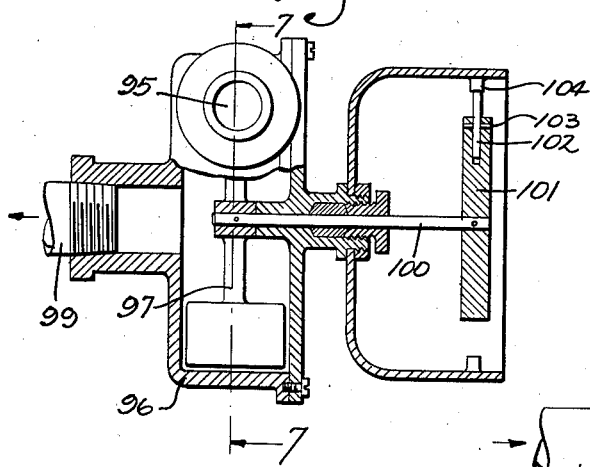
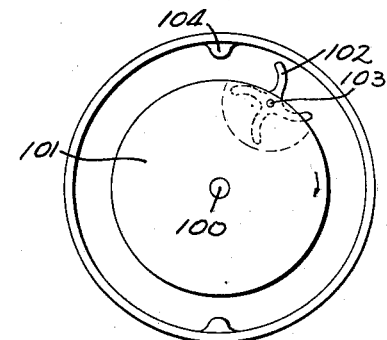
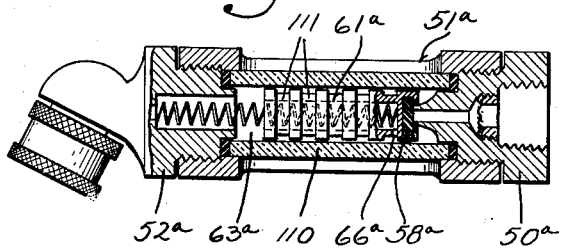
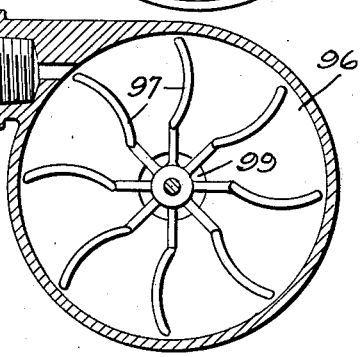
INVENTOR
Arno A. Ewald,
BY
Wheeler, Wheeler & Wheeler
ATTORNEYS Patented Dec. 24, 1940

2,225,690

UNITED STATES PATENT OFFICE 2,225,690

CHARGING APPARATUS FOR ELASTIC FLUIDS

Arno A. Ewald, Oakfield, Wis., assignor to Romort Manufacturing Company, Fond du Lac, Wis., a corporation of Wisconsin Application April 26, 1937, Serial No. 139,012

1 Claim. (Cl. 251—127)

My invention relates to improvements in charging apparatus for elastic fluids.

The primary object of my invention is to provide means for a continuous delivery of air or gas to a receiver at a pressure materially above the desired delivered pressure, and abruptly shutting off such deliveries when the desired pressure is attained in the receiver.

My invention is peculiarly adapted for use in connection with tire filling apparatus, my objects being to expedite tire filling operations by allowing the air to flow into the tire at substantially maximum possible speed, while automatically shutting off the supply when the desired tire pressure has been attained.

In the drawings:

Figure 1 is a view in longitudinal section of a pressure reducing and shut off valve mechanism embodying my invention.

Figure 2 is a front elevation of the dial.

Figure 3 is a sectional view drawn to line 3—3 of Figure 1.

Figure 4 is a sectional view showing a modified signalling mechanism.

Figure 5 is a cross section, taken on line 5—5 of Figure 1.

Figure 6 is a sectional view showing a signalling device embodying a further modification.

Figure 7 is a cross section taken on line 7—7 of Figure 6.

Figure 8 is a face view of the signalling bell shown in Figure 6.

Figure 9 is a sectional view of a modified form of shut-off mechanism.

Like parts are identified by the same reference characters throughout the several views.

If air or other elastic fluid is stored in a supply tank, from which it may be withdrawn to fill tires or other receivers, the pressure in the supply tank may vary considerably from time to time, since the tank will ordinarily not be refilled until the pressure drops below an amount predetermined with reference to a certain degree of excess over the maximum pressure desired in any receiver. Therefore it is customary to employ pressure reducing and regulating mechanisms which are adapted to maintain a uniform pressure in a supply pipe or hose regardless of the degree of excess pressure in the supply tank. Such pressure regulators are made adjustable in accordance with the requirements of any given vehicle tire or other receiver, and they would furnish a satisfactory means for shutting off delivery to the receiver when the desired pressure has been attained, were it not for the fact that the flow of air into the receiver slows down progressively when the pressure in the receiver approaches closely to that in the supply pipe or hose. If it is important that the pressure in the receiver should be exactly that at which the pressure regulator is adjusted to maintain, considerable time elapses between an approximation of the desired receiver pressure and a complete attainment of that pressure.

To avoid this loss of time, metering devices have been employed which deliver air into the receiver in a succession of surges. Such devices employ a controlling valve which automatically opens when the air in the receiver is below the desired predetermined pressure, and which closes intermittently and remains closed when the pressure differential is insufficient to cause it to reopen. This surge method is virtually a metering method by which successive charges are delivered into the receiver until attainment of the desired pressure prevents the delivery of a further charge.

The surge method involves a period of delay between charges, and my invention contemplates elimination of these delays by maintaining a continuous delivery through the inlet of the receiver—usually a valved nipple—at the critical velocity possible to obtain in the nipple or inlet duct under any given constant pressure in excess of the desired pressure in the receiver. I employ a control valve which closes automatically when the desired pressure has been attained but remains in full open position during the entire filling operation, thereby avoiding delays of any kind.

In the embodiment illustrated in Figure 1, the pipe 10 represents a source of air supply, and it may be assumed to be connected with a suitable reservoir, tank, or pump, from which deliveries are controlled by a manually operable valve 11. When the valve 11 is open, air enters the pressure regulator through the pipe 10 and the hollow coupling nut 12, and passes through ports 13 into the cavity 14. It then passes through a tubular screen or filter 15 to a duct 16 in the back wall of the pressure regulator, and thence through a port 17, against the delivery end of which a ball valve 18 is adapted to seat. When the ball valve is open, air may pass to the outlet cavity 19 and thence through the port 20 to a pipe or hose 21. The ball valve 18 is held in proximity to its seat by a cage 22 secured to a cup-shaped member 23 connected with a diaphragm 24 which forms part of the front wall of the pressure regulator and is subject to air pressure in the outlet cavity 19, the air from that cavity being free to pass to the diaphragm around the cage supporting member 23. A compression spring 25 urges the diaphragm to the right in Figure 1, and therefore normally holds the cage 22 with the ball valve slightly retracted from its seat. As is customary in the use of pressure regulating valves, the tension of the spring 25 is adjusted to keep the valve 18 open until a counter-pressure develops in the cavity 19 sufficient to flex the diaphragm in the opposite direction, thus closing the valve.

In its general aspects, the pressure regulator thus far described is similar to those in ordinary use.

The inner end of the spring 25 is seated upon a clamping nut 31, which is provided with a screw 32 connecting this nut with the cage supporting member 23. The other end of the spring is seated in an adjusting nut 35 which is screwed into a tubular housing member 36 supported from the wall 37, to which the diaphragm 24 is clamped. These parts are normally enclosed by a cap 38 which seats against the annular flange 39 encircling the diaphragm supporting wall member 37.

The cap 38 is rotatable and is normally held in any position of rotative adjustment by a clamping nut 40 which holds the cap in motion transmitting engagement with the nut 35, whereby rotation of the cap adjusts the nut inwardly or outwardly to vary the tension of the spring 25. The outer marginal portions 41 of the cap have indicating projections 42 and associated numerals calibrated to indicate desired pressure. The projections 42 and the numerals are preferably calibrated to indicate the ultimate pressure to be attained in a tire or other receiver, with the aid of an auxiliary pressure reducer at the outer end of the hose 21 hereinafter to be described.

The annular flange 41 therefore serves as a dial which, when rotated, varies the tension of the pressure regulating spring 25, and indicates the degree of variation with the aid of a pointer 45. The shut-off mechanism will now be described.

The delivery end of the hose 21 is connected with the ported end piece 50 of a valve casing 51, which is preferably cylindrical in form and has its delivery end connected with an ordinary chuck 52 adapted to be applied to the tire nipple. As is customary with such chucks, it has a valve 53 which seats with the pressure, and is provided with a stem 54 adapted to engage the stem of a tire nipple valve, whereby the tire nipple valve and the valve 53 may be opened when the chuck is applied to the nipple with sufficient manual pressure. A spring 55 normally holds the valve 53 to its seat.

It will be noted that the stem 54 nearly fills the outlet port in the seat for the outlet valve 53. The capacity of this port is slightly less than the capacity of the plunger port 66 plus that of the clearance space between the plunger and the casing. As stated in this application, the air delivery through, and past, the plunger is just sufficient to maintain rapid flow through the outlet but insufficient to cause the plunger to reciprocate, or move toward its seat until the filling operation has been completed, whereas, in all prior art valves of the class to which this invention pertains, reciprocation, and a pulsating delivery, has been unavoidable. Such reciprocation is characteristic of pop valves.

In my prior Patent No. 1,882,215, I partially overcame the delay resulting from such vibration by using a plunger valve which serves as a piston to compress air under its own momentum during its out stroke and drive the air so compressed through the outlet under momentary excess pressure, thus compensating for the delay in delivery during the return stroke of the plunger. But my present invention invokes a new principle in providing for a continuous delivery at uniform pressure established as a pressure differential between the capacity of the outlet and that required to aid the spring in actuating the valve toward its seat.

Within the cylindrical casing or barrel 51, a valve 58 seats against the pressure of the fluid coming through the port 59 in the end piece 50. This valve is provided with an outwardly extending hollow plunger 61, in which a compression spring 62 is seated, with its opposite end seated in an enlarged bore 63 in the shank of the chuck 52. The valve 58 and plunger 61 are loosely fitted in the barrel or casing 51, and the latter has an annular channel 65 formed in its inner wall, which, when the valve is in open position, allows the air to pass freely into the channel and thence through the small port 66 to the interior of the plunger, from which it passes to the port 67 in the chuck.

With the chuck valve 53 closed, air may be delivered through the pipe or hose 21 to force valve 58 open, and hold it open until the pressure is sufficiently equalized on the outlet side to allow the spring 62 to close this valve.

In the construction shown, the spring tension is calculated to establish a 35 pound differential, whereby valve 58 will be closed when the pressure of the air in the pipe 21 is no greater than 35 pounds in excess of that on the outlet side. Thereupon, if the chuck stem 54 is applied to a nipple valve in a tire or other receiver under sufficient pressure to open the nipple valve and also the chuck valve 53, valve 58 will again be opened if the pressure in the receiver is low enough to allow air to flow into it from the chuck.

When the valve 58 is thus opened the cavity 68 will be enlarged and placed in free communication with the annular channel 65, as indicated by dotted lines in Figure 1. With the capacity of the port 66 only a little greater than that of the tire nipple and considerably less than that of the inlet port 59, the pressure upon the end of the valve 58 will be sufficient to hold it in a full open stationary position until the pressure in the tire or other receiver is approximately 35 pounds below that in the hose pipe 21. Thereupon the spring 62 will close the valve 58, in a steady but positive movement.

Probably the increased compression of the spring when the valve is fully open causes the valve to start its closing movement a little before the pressure in the receiver reaches that for which the pressure regulator has been set to deliver. But leakage past the plunger while the valve is closing allows the air in the receiver to attain the desired pressure more exactly than has heretofore been thought possible.

The plunger has clearance in the barrel 51, (or tube 110 in Fig. 9), of approximately, .002 of an inch and the film of air leaking past the open valve and plunger may have a steadying influence upon its closing movement.

In the construction illustrated in Fig. 1 and also in that illustrated in Fig. 9, the port 66 (66a in Fig. 9) is .05 of an inch in diameter. While the air is flowing into the tire through a standard tire nipple, a pressure of about 55 pounds is maintained between the plunger valve and the nipple when the pressure regulator has been set to raise the pressure in the tire to 40 pounds. With this differential, it requires only a few seconds longer to fill a tire, than the time required to deliver the same volume of air through the chuck into the atmosphere with the chuck valve open.

The plunger 61 and its head 58 provide a combination check valve, piston and throttling slide valve. The head 58 serves as a check valve to normally close the inlet against the pressure of the supply fluid. This head operates as a piston when moving from its closed position to an open position of registry with the annular cavity 65. When in the open position the lateral port 66 is in registry with said annular cavity, beyond which the open end or skirt portion of the plunger extends. This skirt portion limits air delivery to the capacity of the lateral port 66, plus the film of air on the plunger surface.

The lateral port 66 is of sufficiently small capacity to prevent a valve actuating pressure from building up at the outlet side of the valve until the predetermined pressure has been attained in the receiver. By keeping the air pressure in the hose 21 substantially constant and throttling the air delivery from cavity 65 to the outlet end of the cylinder, I am able to prevent the development of violent air pulsations in the outlet end of the cylinder, which have heretofore caused plunger valves to vibrate with a staccato sound during air delivery. I also maintain a continuous air delivery substantially equal to the capacity of the outlet under substantially the maximum pressure attainable without material plunger actuation.

My improved valve differs from the so-called ordinary pop valve and the similar control valves heretofore employed to establish a differential between the outlet of a pressure regulator and a receiver, in that such valves as heretofore used have been held open in part by pressure and in part by kinetic energy, and have tended to vibrate, thereby setting up a pulsating pressure in the air. Such pulsations materially delay the filling operation as compared with the time required when the flow is continuous at the same degree of pressure differential.

When valve 58 is open, it, and the plunger head which supports it, are in full registry with the annular cavity 65, and this cavity is long enough to maintain communication with the port 66 under such conditions.

In Figure 9 I have illustrated a modified form of shut-off mechanism in which the movements of the valve are visible. In this construction a cylindrical cage 51a is substituted for the barrel 51 illustrated in Figure 1, and between the end pieces 50a and 52a a glass cylinder 110 is secured within the cage and serves as a transparent sleeve bushing or barrel through which the movements of the valve may be observed. The valve 58a is substantially like that disclosed in Figure 1, but the plunger 61a is preferably annularly recessed to provide channels 111. The head of the valve 58a is of sufficiently less diameter than the glass cylinder to allow air to pass around the head of the valve to the port 66a of the plunger. This port may be omitted if sufficient clearance is provided to permit the desired volume of air to pass along the plunger. But I prefer to provide the port 66a in order to avoid unnecessary friction between the plunger ribs and the glass cylinder 110. The head of the valve may be grooved and slightly reduced to allow sufficient air to pass the head of the valve 58a to keep the cavity 63a filled with air at a pressure in excess of that for which the device is set to deliver to the tire. I am thus enabled to dispense with the annular cavity 65 illustrated in Figure 1, as provided in the barrel 51.

Inasmuch as the valve 58 disclosed in Figure 1 remains fully open while air is being delivered through the chuck there is no pulsation to produce a signal which can be either felt or heard. Therefore, I may provide the end piece 50 with a small port 70 leading through the valve seat and communicating with a whistle barrel 71 which may or may not be formed integrally with said end piece 50. Port 70 leads to the whistle barrel inlet cavity 72, from which the air escapes through a port 73 to an opening 74 across an air cavity 75, wherein air pulsations are set up in a well-known manner to produce the desired signal pending completion of the filling operation.

Any other means for signalling or indicating the flow of air to the receiver may be employed. In Figure 4 I have illustrated a barrel 80 which may be located anywhere in the air line and provided with an inlet at 81 and an outlet cavity 82, from which air may pass to the barrel 51 of the charging regulator through a pipe or hose 83. In this signalling device, the kinetic energy of the flowing air is exerted against the spoon-shaped extremity 84 of a lever 85 which is pivoted at 86 and connected by a stem 87 with a valve 88 controlling delivery to the inlet cavity 89 of the whistle. The lever may be forked and clamped about the spherical head of the stem 87 by a bolt 79.

A light spring 90 tends to hold valve 88 in a closed position, but a jet of air passing through the port 91 will develop sufficient kinetic energy against the spoon-shaped bowl or bucket 84 to hold the lever in a position in which it is shown in Figure 4, and thereby maintain the whistle valve 88 in the open position while air is flowing.

In Figures 6, 7, and 8 I have illustrated a further modification, wherein air traversing any portion of the air line may be delivered through a port 95 into a cylindrical chamber 96 containing a paddle wheel 97 to be driven by the air as it passes through this chamber to the outlet pipe or duct 99. The paddle wheel is connected by a rod 100 with a disk 101 having a recess, in which a rotary star wheel 102 is pivoted at 103 in such a manner that as the disk rotates, one arm of the star wheel will be brought into contact with a suitable striker 104 once during each revolution of the wheel.

The three signalling devices illustrated in the drawings are merely representative of any one of a considerable number of air operated signals, which may be employed within the scope of my invention. Also, my invention is not limited to include the use of signals of this type or of any other type, since they are not essential to predetermination of receiver pressures.

While the general organization of the pressure reducing and regulating valve disclosed in the drawings may be assumed to conform to standard practice, it contains certain novel features of importance from the standpoint of simplicity, lowered cost, and convenience of access.

Removal of the plug 12 affords access to the filter screen 15. The removal of the back wall cap 200 affords access to the cage 22, the ball 18, and the ported seating member 18', which is threaded into the back wall and removable when the cage and ball are removed.

The diaphragm clamping wall 37 constitutes the front wall of the diaphragm chamber, and this is removed after removing the cap 38. The portion of the cap 38 which is engaged by the clamping nut 40 has its inner surface made to fit the conically tapered end of the nut 35, whereby calibration and accuracy in calibration are facilitated by loosening the clamping nut 40 and rotating the cap relatively to the nut 35. The outer margins of the cap 41 are inturned to embrace the circular wall 39, thus protecting the interior from the elements.

Referring to Figure 3, it will be observed that the inlet nozzle through which the port 16 extends, projects through an enlarged hole in the valve supporting member 23, whereby this member may move with the diaphragm without striking the inlet nozzle.

I claim:

In a valve mechanism of the pop valve type, the combination with a cylindrical casing having inlet and outlet ports at its respective ends, of a plunger substantially filling the outlet portion of the casing and provided with a spring normally urging the plunger toward a position closing the inlet port, there being slight clearance between said casing and said plunger, said plunger being provided with a port affording communication from its receiving to its delivery side, the capacity of said port computed with reference to the clearance space between the plunger and casing being so proportioned to that of the casing inlet and outlet ports as to allow the plunger to be held substantially constant in open position against the tension of its spring during normal delivery of fluid through the casing by preventing fluid from passing the plunger at a rate greater than that of delivery through the casing outlet port.

ARNO A. EWALD.